United States Patent [19]

Kucik

[11] Patent Number: 5,431,588
[45] Date of Patent: * Jul. 11, 1995

[54] REPLACEMENT OIL FILTER ASSEMBLY

[76] Inventor: Michael Kucik, 4603 Hazelwood Ave., Baltimore, Md. 21206

[*] Notice: The portion of the term of this patent subsequent to Nov. 22, 2011 has been disclaimed.

[21] Appl. No.: 281,471

[22] Filed: Jul. 27, 1994

Related U.S. Application Data

[63] Continuation-in-part of Ser. No. 173,659, Dec. 27, 1993, Pat. No. 5,366,400.

[51] Int. Cl.⁶ .......................................... B63H 21/10
[52] U.S. Cl. ............................. 440/88; 210/DIG. 17
[58] Field of Search ................ 440/88; 210/168, 238, 210/DIG. 17; 184/1.5

[56] References Cited

U.S. PATENT DOCUMENTS

| | | | |
|---|---|---|---|
| 1,731,209 | 10/1929 | Champion . | |
| 1,982,376 | 11/1934 | De Lancey | 210/164 |
| 2,049,498 | 8/1936 | Hardinge | 210/57 |
| 2,533,266 | 12/1950 | Kovacs et al. | 210/183 |
| 3,380,593 | 4/1968 | Uhen et al. | 210/356 |
| 3,677,369 | 7/1972 | Schramm | 184/1.5 |
| 3,912,633 | 10/1975 | Delaney | 210/168 |
| 4,101,000 | 7/1978 | Scully | 184/1.5 |
| 4,106,689 | 8/1978 | Kozulla | 233/23 R |
| 4,167,483 | 9/1979 | Rosaen et al. | 210/130 |
| 4,709,722 | 12/1987 | Knapp | 184/1.5 |
| 4,815,566 | 3/1989 | Caruso et al. | 184/1.5 |
| 4,875,884 | 10/1989 | Meisenburg | 440/88 |
| 4,902,205 | 3/1990 | Bewley, III | 123/196 S |
| 4,977,978 | 12/1990 | Batrice | 184/1.5 |
| 4,986,777 | 1/1991 | Preston | 440/88 |
| 5,038,578 | 8/1991 | Manz et al. | 62/292 |
| 5,074,379 | 12/1991 | Batrice | 184/1.5 |
| 5,086,522 | 2/1992 | Stofko, Sr. | 4/295 |
| 5,110,460 | 5/1992 | Gilas | 210/149 |
| 5,196,112 | 3/1993 | Eichman | 210/171 |
| 5,199,914 | 4/1993 | Marsh | 440/88 |
| 5,366,400 | 11/1994 | Kucik | 440/88 |

OTHER PUBLICATIONS

HASTINGS Lifeguard TM Filters—1993 Catalog; cover of catalog, inside cover of HASTINGS Lifeguard TM Oil Filters (no drain), pp. 810–811 listing Diesel fuel filters (with drain–cocks) yellow highlights; p. 856 showing line drawings of Diesel fuel filters L9, L10, and L11 having drain cocks.
E & B Discount Marine—cover of 1994 catalog; p. 69—Gas & Diesel Fuel Filters.
Boat/U.S. 1994 Annual Equipment Catalog—cover of catalog, pp. 169–173 showing fuel filters and gas filters (with drains) & an oil filter (p. 173) without a drain.
WIX Filters—p. 661—Installation Instructions for Automotive Spin-On Oil Filters (no drain); p. 638—Universal Fuel/Water Separator Filter Installation Kit (with drain).

Primary Examiner—Jesus D. Sotelo
Attorney, Agent, or Firm—Leonard Bloom

[57] ABSTRACT

An oil filter for a marine or automotive engine has a nipple provided with a valve. After the oil has been drained from the engine crankcase, a hose connects the nipple to a suitable container, and the valve is turned to collect the residual oil in the filter. Thereafter, the filter may be unscrewed, and a new filter installed on the engine.

12 Claims, 15 Drawing Sheets

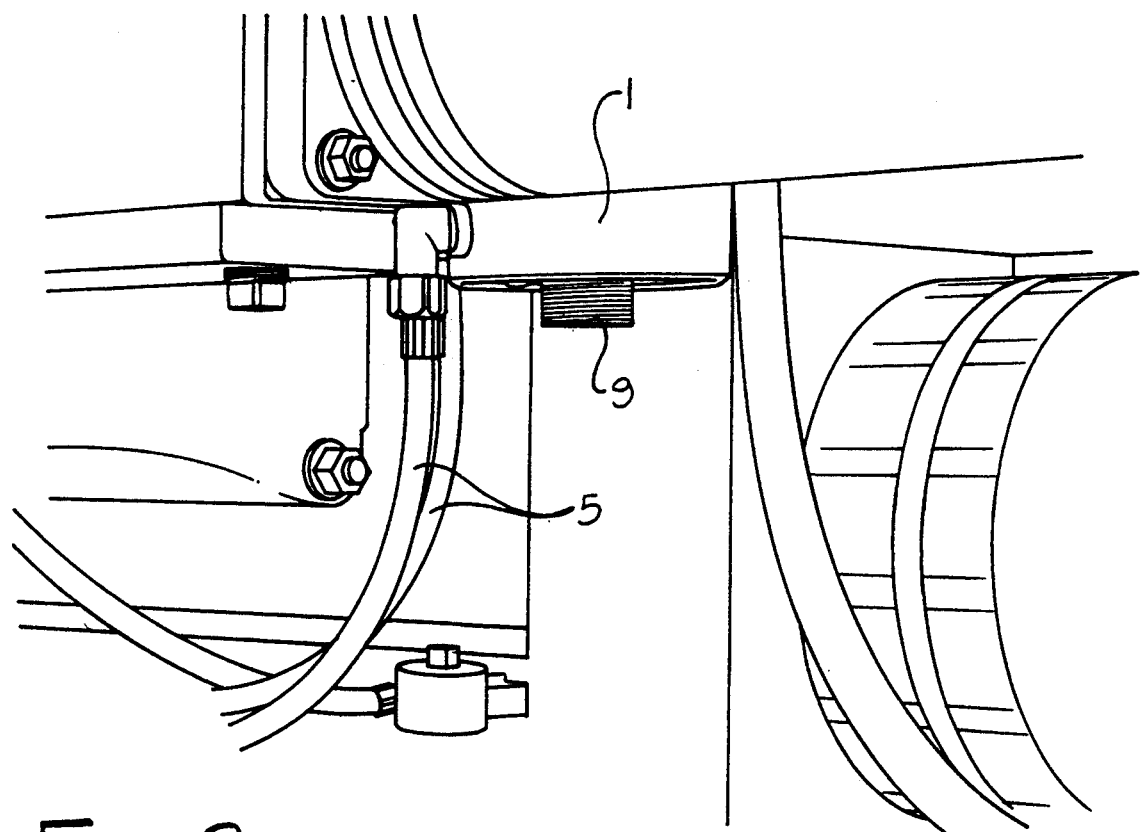
Fig. 9
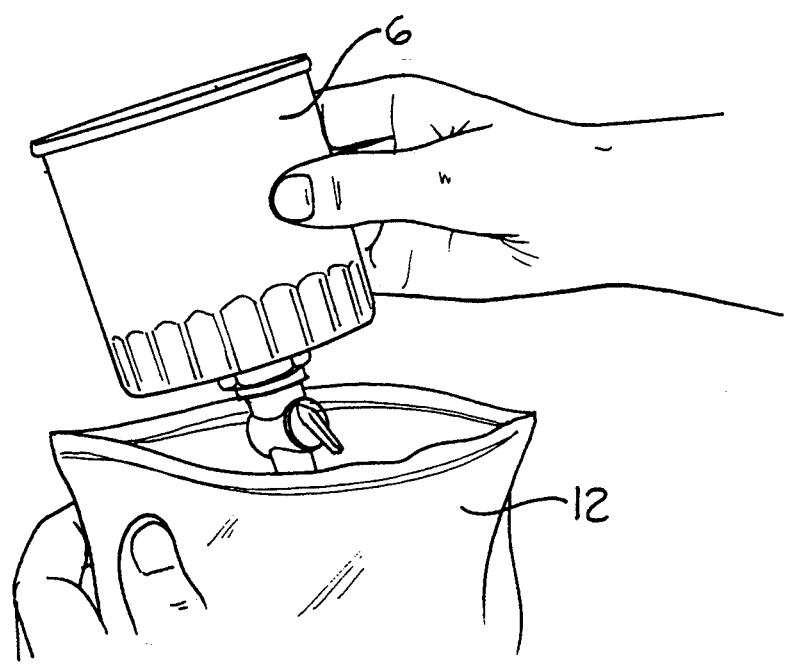

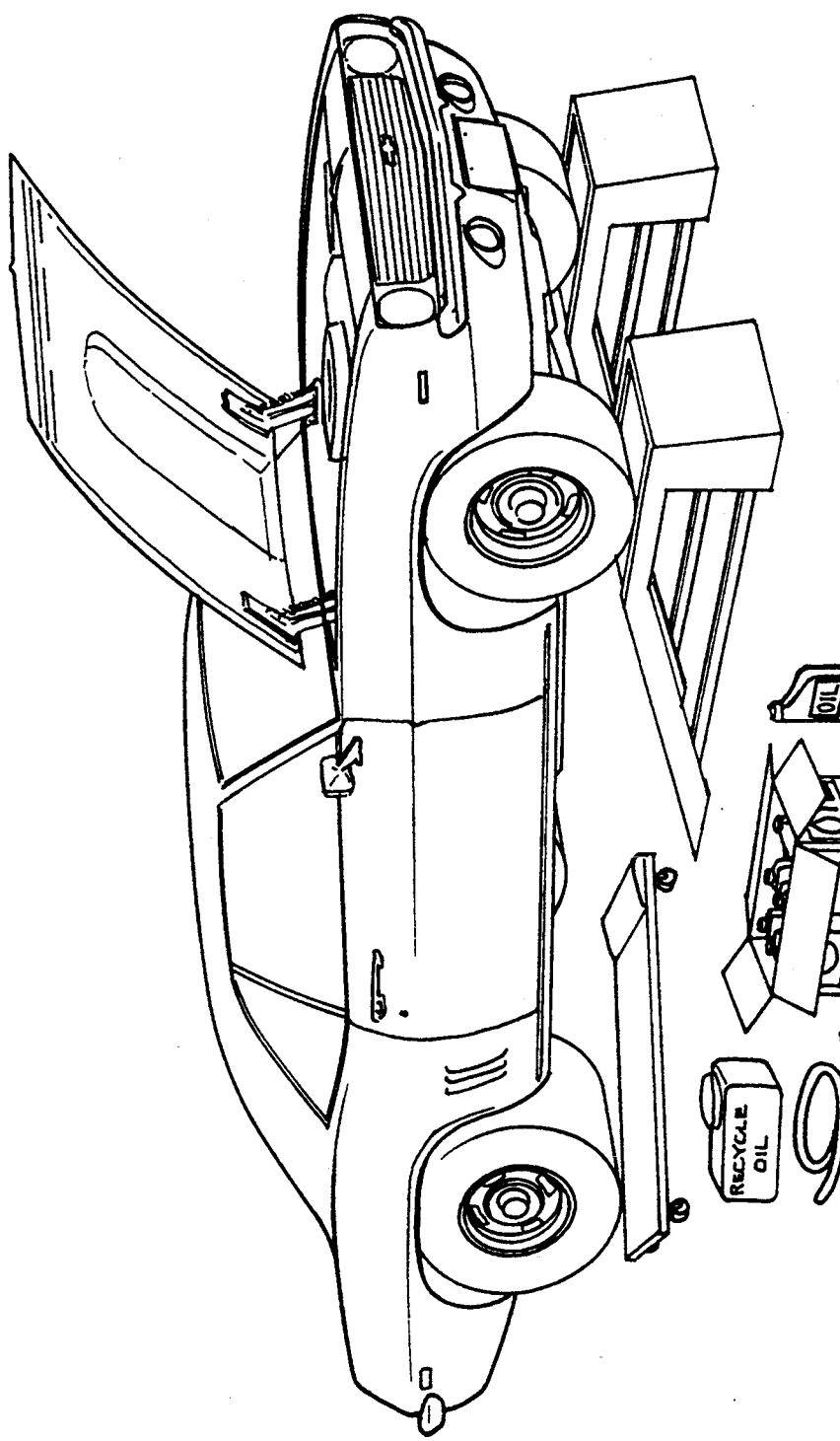
Fig. 13
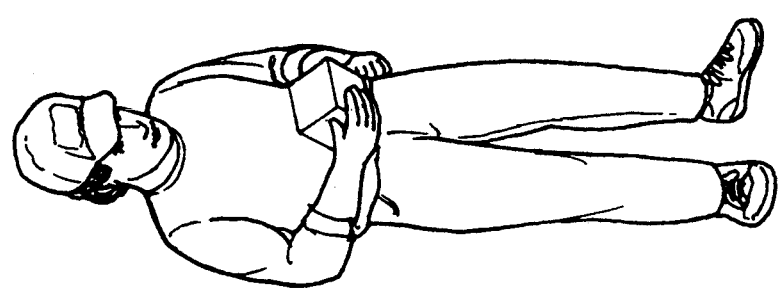

REPLACEMENT OIL FILTER ASSEMBLY

CROSS-REFERENCE TO RELATED APPLICATION

The present invention is a continuation-in-part of application Ser. No. 08/173,659 filed Dec. 27, 1993 for "Apparatus And Method For Draining Out The Residual Oil In A Replacement Oil Filter Used In A Marine Engine For Avoiding Pollution To The Environment When Changing Filters", now U.S. Pat. No. 5,366,400 issued on Nov. 22, 1994 the disclosure of which is incorporated herein in its entirety.

BACKGROUND OF THE INVENTION

The present invention relates to an oil filter cartridge having a means attached thereto for removing residual oil from the cartridge after the engine has been drained of oil and before the cartridge is removed.

In recent years, there has become a greater awareness on the part of government as well as the general public of the need to protect the environment. Amongst the problem areas of environmental pollution are the air, land and water; solid waste and automobile; industry such as manufacture and mining, wherein toxicity is caused by water run-off into various waterways and water pollution being caused by waste disposal of manufacturing by-products into waterways. The adverse affects of pollution are being felt by man, as well as animals and no environment is free from pollution.

Because of the problem of pollution affecting the health of man and animals, and the need to safely dispose of all sorts of products, there has become a greater awareness of the need to protect the environment from pollution.

We are all aware of steps being taken by the government to limit pollution and to protect the environment. For example, many pollution control devices have been installed by automobile manufacturers in an effort to limit air pollution. Many states have installed emission testing stations to insure that automobiles operate in a fashion to produce the least amount of air pollution.

A popular method of limiting solid pollution is recycling, and many communities have installed special bins for the collection of metal, paper, plastic or glass.

Because of the greater awareness of the need to protect the environment from pollution, Congress and the states are taking a closer look at waterways, such as rivers and lakes, the pollution therein and what is causing the pollution. Boating is being looked at as a source of pollution. Besides the fact that boats may cause pollution through exhaust gases caused by the engine and solid waste disposal, oil disposal is becoming a particular problem area of concern. Congress and the states are taking a closer look at boating, and they are considering new measures to control various forms of pollution. One of the areas in which greater care is needed to protect the environment is oil disposal from various types of engines. The disposal of oil in U.S. waters is strictly prohibited under federal law; and a substantial penalty can be imposed if this law is violated. There are 12 million boat owners so you can see that there is potentially a great area of concern regarding the issue of pollution.

Of course, new and additional regulations may be required to limit pollution; however, the simple changing of old habits by boat owners on a voluntary basis can materially limit pollution. The adoption of common-sense measures can make water pollution-free, and a more pleasant environment for recreation and commerce. Care should be taken in the use and disposal of products used to clean the boat's hull and deck. Of course, these cleaning products run off into the water when rinsed and are a source of pollution. Wood oils, polishes, solvents, acids and paints are obvious sources of pollution, and care should be taken with them in use as well as disposal. Because of environmental concerns, manufacturers are formulating environmentally safe, non-toxic, biodegradable products. These products in water degrade and therefore have a lesser polluting effect on the environment. Eliminated from these products are phosphates, caustics, acids, chlorine, toxic solvents and fluoronated hydrocarbons. This latter product is the agent suspected to be detrimental to the earth's ozone layer. For example, ships' horns which were once actuated by fluorohydrocarbons now use compressed air which can be replaced and put under pressure by the use of a pump.

The disposal of oil in the waterways is absolutely prohibited by law and subject to a $5,000 fine. Bilge "pillows" and engine compartment absorbent pads are used to soak up spilled oil. As can be readily discerned, the use of these absorbent devices is messy.

Recognizing the need to limit pollution, Boat/US has established a Clean Water Trust as a non-profit organization to initiate projects and to produce educational programs to limit boat pollution. There will be established a liaison between boating groups and environmental groups.

During prior art oil changes, residual oil from the filter cartridge would spill into the bilge and from there, it would be pumped out of the bilge. Of course, pumping bilge oil into the water is illegal and disposing of bilge oil pumped into a container is cumbersome because the oil is mixed with water and to dispose of the oil in a landfill presents a pollution problem. An advantage of the present invention is that residual oil from the filter is piped into a container where the oil can be recycled or disposed of with the container and the oil in the container is not mixed with water or other impurities as would be found in oil from the bilge and, therefore, recycling is facilitated.

FIELD OF THE INVENTION

Recognizing the problem of pollution by boats and in an effort to avoid oil pollution of water when changing the oil in marine engines, the present invention comprises a new method and apparatus which will facilitate the changing of oil in marine engines and will prevent the spilling of residual oil from the filter during oil changes.

The prior art in an effort to avoid oil spill used a large plastic bag placed over the oil filter cartridge as it was being unscrewed and removed after crankcase oil removal. The purpose of the plastic bag was to catch residual oil which spilled out during the oil filter cartridge unscrewing and removal.

As can be imagined, this method created a mess for the person removing the canister and was particularly difficult to perform in the cramped quarters of a boat engine compartment which was made more cramped by the multitude of adjacent hoses and pipes which run adjacent to the engine. Of course, this spilling of oil was the potential cause of pollution and a violation of pollution laws. Moreover, the oil-filled cartridge was difficult to dispose of without causing pollution.

PRIOR ART

U.S. Pat. No. 4,977,978 to Batrice shows an oil change apparatus for use in changing motor oil in a motor vehicle which includes a key-operated drain valve, and wherein the oil filter is relocated to a position which is convenient and easy to access. The oil drain plug is also relocated to a position making it easily accessible for oil change. A pump is also supplied to pump used engine oil and thereby make oil change easy and convenient. While the patent to Batrice may show a convenient method for changing oil, the patent does not show a valve on an oil cartridge to drain residual oil from the canister. Therefore, one using the device of Batrice would still be confronted with the spilling of residual oil when the canister per se was removed.

U.S. Pat. No. 5,074,379 to Batrice is directed to an oil filter relocation assembly which is designed to relocate oil filters which are generally placed in an inaccessible location. The oil filter cartridge is conveniently located but does not recognize the problem solved by applicant and, therefore, would have oil spillage when the filter cartridge is changed.

Bewley in U.S. Pat. No. 4,909,205 discloses a method and apparatus for changing oil and oil filter in an engine. The oil sump has an oil filter and oil is changed by draining the sump and connecting an external reservoir containing oil. When oil is needed in the engine, oil is pumped from the reservoir to the engine. The filter is changed by conventional means. There is no recognition by Bewley of how to prevent oil spillage during oil filter removal, nor does Bewley recognize a need to install a valve in the oil filter canister itself.

Disclosed by Meisenburg in U.S. Pat. No. 4,875,884 is a marine propulsion device with an engine and an oil pan depending downwardly from the engine; wherein a tube is used to remove oil from the oil pan and the oil is removed from the boat through a tube drain. The valve connected to the tube is opened and the oil is able to drain at a position outboard of the boat. Meisenburg does not involve itself with oil filters and does not recognize the problem or solution contemplated by the present invention. Meisenberg is cleaning the crankcase, not the filter.

U.S. Pat. No. 4,101,000 to Scully teaches an oil recovery device where the housing containing the filter is drained of oil. The engine is placed below the oil filter cartridge unit. The engines used by Scully are engines in military trucks, and the filters are positioned in an upstanding orientation with oil being pumped up into the filters. Scully has a drain opening in the bottom surface of the filter base. He has found the position which would be most convenient for an oil drain valve under the filter, but it is obstructed by mechanisms such as valves, liquid lines, electrical lines, etc. and, therefore, it would be impossible to position a container or funnel to collect the oil. Because of this deficiency, there results oil splashing and spilling. Scully does not contemplate, as a single screw-on unit, a valve in a canister housing for the release of residual oil when the oil filter canister is removed during an oil change. He does not recognize the problem solved by the present invention.

U.S. Pat. No. 5,196,112 to Eichman discloses an oil drain apparatus directed to an oil filter boss in association with a valve. In operation, the oil is drained through the filter device via a conduit adjacent to the filter. The filter is sideways on a special mounting bracket and would be difficult, if not impossible, to fit on a marine engine in the cramped quarters housing the marine engine.

Preston in U.S. Pat. No. 4,986,777 is directed to a marine engine oil drainage device for draining oil from an inboard engine, wherein the engine is within the cramped engine compartment. No disclosure in this reference of the removal of an oil filter cartridge during oil change.

U.S. Pat. No. 4,815,566 to Caruso et al is drawn to a convenient method of oil change, however no method for changing the oil filter canister is disclosed.

In short, none of the prior art devices show or suggest the valve-oil filter canister device herein disclosed.

OBJECTS OF THE INVENTION

Accordingly, it is the basic object of the invention to provide for a more efficient method of changing oil in engines and, in particular, in the replacement of the oil filter.

A further object is to eliminate oil-spill during oil changes, and, in particular, replacement of the oil filter as distinguished from draining the crankcase oil.

A still further object is to create an efficient system for saving waste oil after oil changes by piping oil into a container.

An object of great importance is the elimination of pollution caused by oil spills because residual oil is piped through a valve to a container, instead of into the bilge from where it can be pumped to cause the pollution of waterways.

Another object is the elimination of mess during oil changes because the valve on the filter cartridge allows for waste oil to be piped from a valve to a container for disposal.

A still further object is the benefit of disposal of an oil filter cartridge relatively free of residual oil.

A most important object is to create an easy method of changing oil in the cramped conditions of the engine quarters by the use of the filter cartridge with valve attached.

SUMMARY OF THE INVENTION

The present invention is designed to alleviate the difficulties of the prior art oil filter cartridge removal, as well as eliminating the possibility of oil spill and consequent pollution which would result. The object of this invention is accomplished by supplying an oil filter cartridge which has two openings. One of the openings is for attachment to an engine through a threaded member and the second opening is attached to a valve or equivalent device. In operation, engine oil is drained from the crank-case and then before removal of the oil filter canister, the valve on the canister is opened to remove residual oil in the canister. All the residual oil can be removed into a container, and the canister can be conveniently removed and discarded without fear of spilling oil and the old cartridge free of oil readily disposed of and the new cartridge easily installed.

The oil filter cartridge of the present invention is a container or canister enclosing an oil filter. The cartridge is fitted so as to be able to be attached to an engine, usually by being threaded at one end and with the cartridge having a valve means built in to the cartridge to drain residual oil during the changing of crankcase oil.

The valve drains residual oil contained in the cartridge. A hose can be attached to the valve to drain the residual oil in the cartridge into a container for non-polluting disposal. A petcock or sealed orifice can be used as an equivalent valve means to drain the residual oil from the cartridge.

It is to be understood that a marine engine presents unique problems regarding oil changing because of the close quarters of the engine compartment. Waste oil due to dripping and spilling drops to the bilge from where it is pumped out, possibly polluting the water and environment. The valved oil filter cartridge attached to the engine eliminates oil spillage when engine crankcase oil is changed because residual oil is drained from the valve on the filter cartridge into a container. The drained oil filter cartridge can be safely disposed of.

It is understood that the valve on the filter cartridge is firmly sealed so that the engine or boat vibration will not cause the valve to loosen and open to cause accidental spillage. The valve is designed so as to be opened when oil is changed, but not when the boat and engine are in ordinary use.

In a special embodiment of this invention, a marine engine within close quarters of an engine compartment having a bilge and a bilge pump for pumping out the bilge into the water; and wherein the engine crankcase contains a replaceable oil filter cartridge which is replaced following the drainage of oil from the crankcase with the residual oil from the oil filter cartridge instead of spilling into the bilge and the bilge pump pumping the waste oil into the water, the present invention has the improvement of having an oil filter cartridge having a bottom opening formed therein containing valve means carried by the oil filter cartridge and in communication with the bottom opening therein, such that after the oil has been drained from the crankcase, the valve means may be opened to drain the residual oil out of the oil filter cartridge and into a suitable container prior to removal of the oil filter cartridge, thereby preventing the residual oil from flowing into the bilge, and thereby preventing the water from being polluted when the bilge is pumped out. Finally, the cartridge free of oil can be removed and safely disposed of in an area such as a landfill without environmental pollution.

Viewed in another aspect, the present invention provides a replaceable oil filter assembly for an engine. This assembly includes an oil filter having a top portion provided with a gasket and further provided with a central opening threaded to receive a threaded stud on the engine, such that the oil filter may be hand screwed on to the threaded stud of the engine. The oil filter further includes a bottom portion provided with a nipple extending therebelow. The nipple is substantially aligned with the central threaded opening in the top portion of the oil filter along a longitudinal central axis of the oil filter, and the nipple is provided with a valve. As a result, after the oil in the crankcase of the engine has been drained and before the oil filter has been unscrewed, the valve may be turned to allow the residual oil in the oil filter to be collected in a suitable container.

In one embodiment, the engine is a marine engine having a bilge; and in another embodiment the engine is an automotive engine.

Preferably, the valve is turned about an axis substantially perpendicular to a longitudinal central axis of the oil filter.

These and other objects of the present invention will become apparent from a reading of the following specification, taken in conjunction with the enclosed drawings.

BRIEF DESCRIPTION OF THE DRAWINGS

FIG. 9 shows the oil filter cartridge being removed and discarded with no spill of residual oil in the filter.

FIG. 13 is a pictorial view showing a typical homeowner preparing to change the oil in his car, the car being elevated on ramps in the driveway.

DESCRIPTION OF THE PREFERRED EMBODIMENTS

Figure 1:
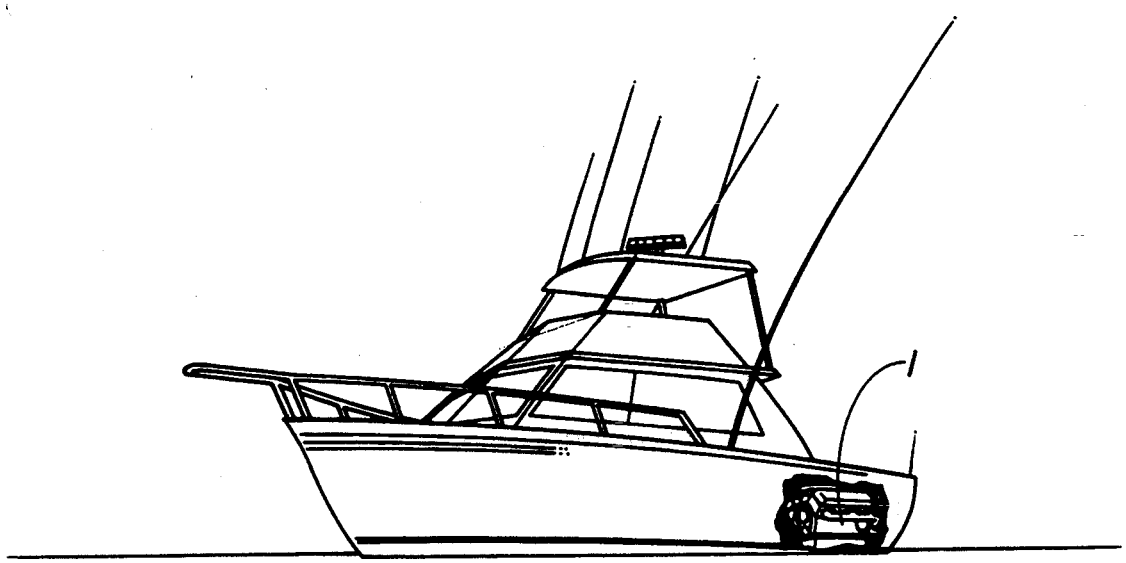
FIG. 1 is a perspective view of a conventional boat with part of the hull broken away to show the marine engine.
Figure 2:
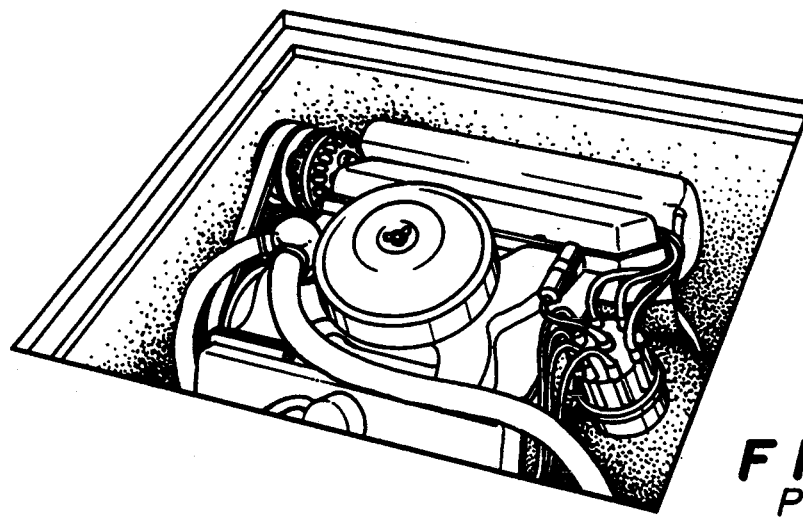
FIG. 2 is a pictorial view of the crowded engine bay area of the boat of FIG. 1.
Figure 3:
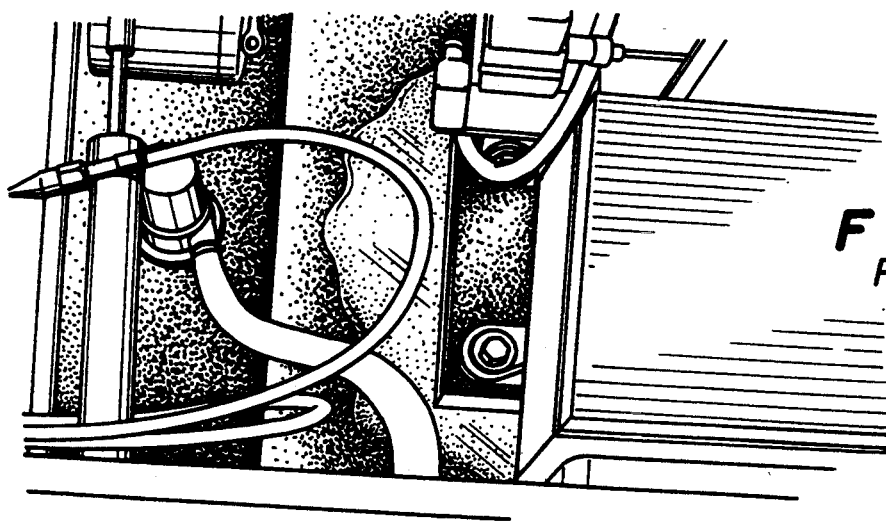
FIG. 3 is a pictorial view of the foul and unclean bilge area of the boat of FIG. 1.
Figure 4:
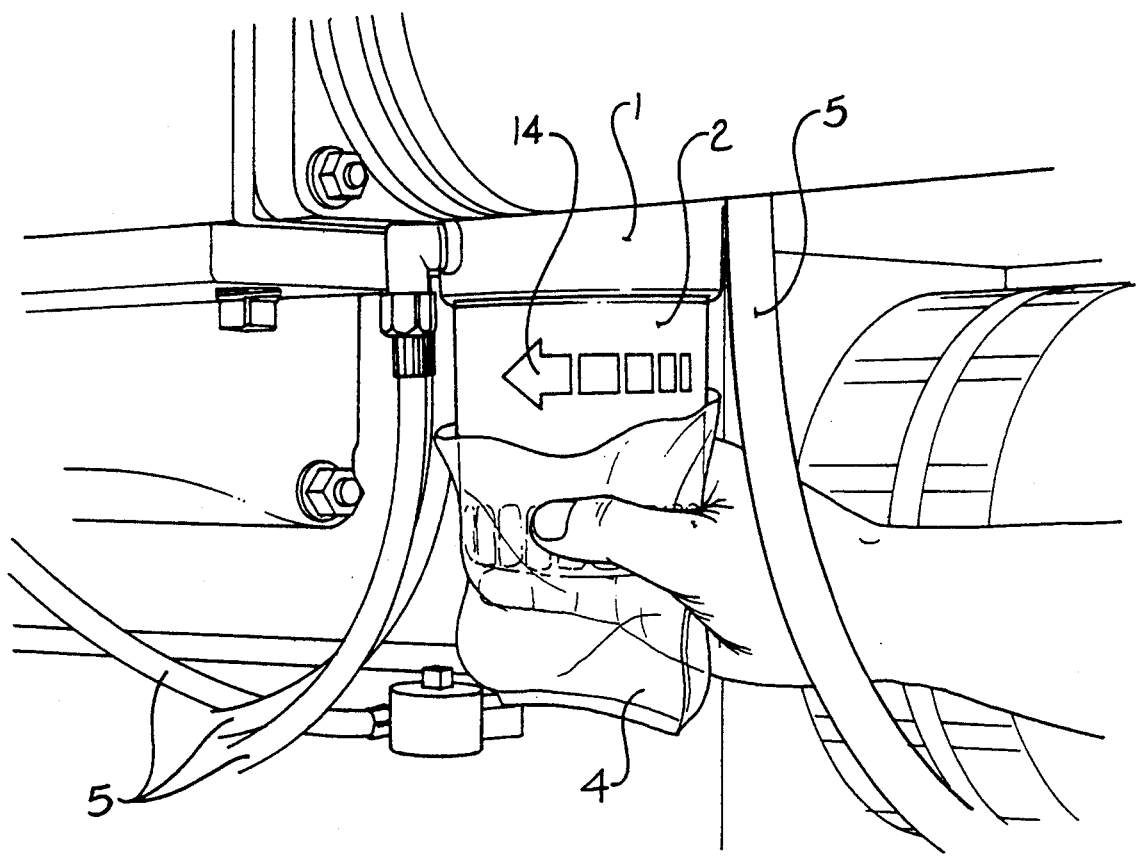
FIG. 4 is a pictorial view showing the prior art method of removing an oil filter cartridge from the marine engine using a plastic bag to catch oil that escapes during cartridge removal and to dispose of the cartridge; also shown are the cramped conditions in the environment where the cartridge is removed. The arrow 14 shows the direction in which the cartridge is turned for removal.
Figure 5:
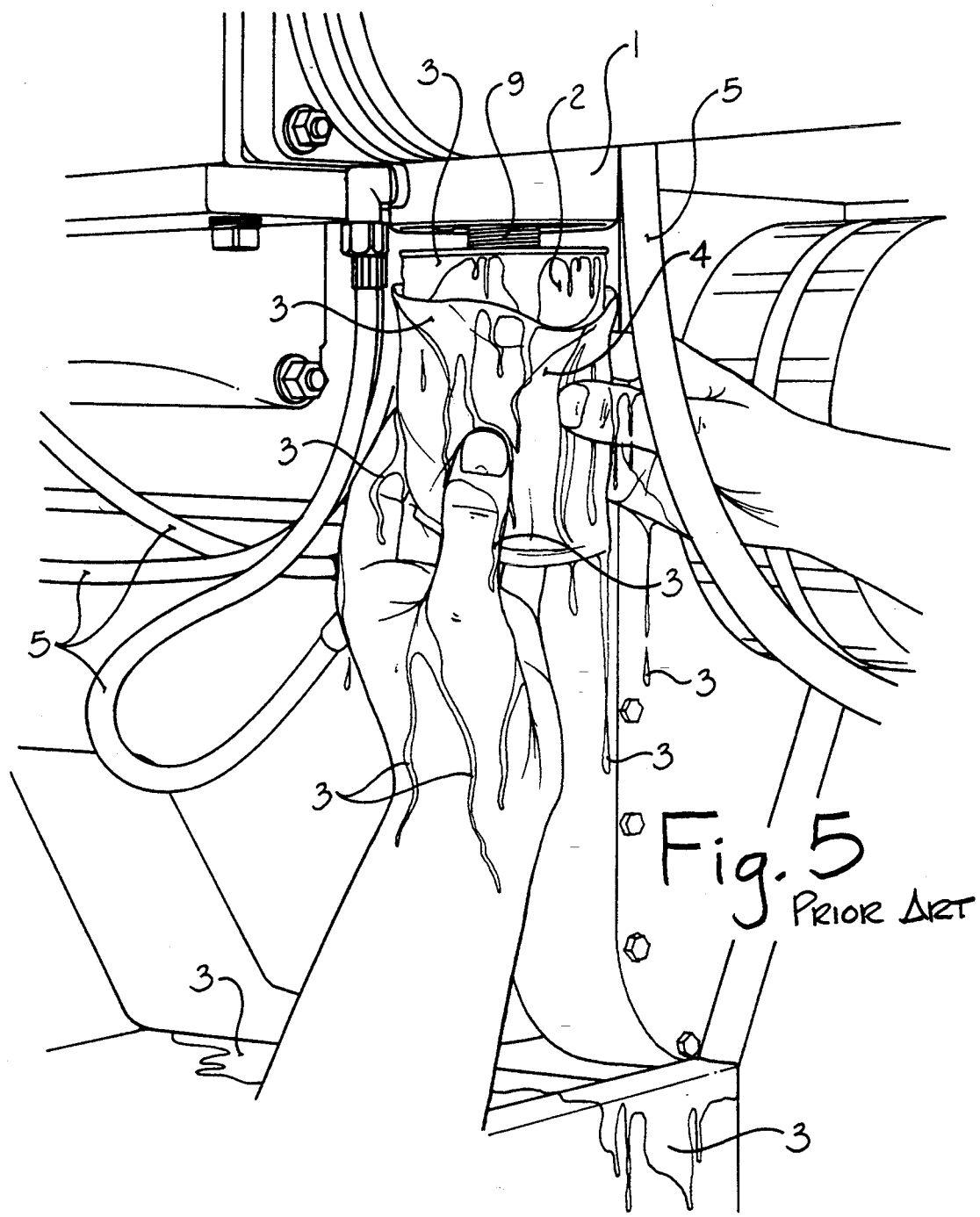
FIG. 5 corresponds substantially to FIG. 4, but shows the oil escaping from filter itself as well as from the plastic bag during removal of the cartridge.
Figure 6:
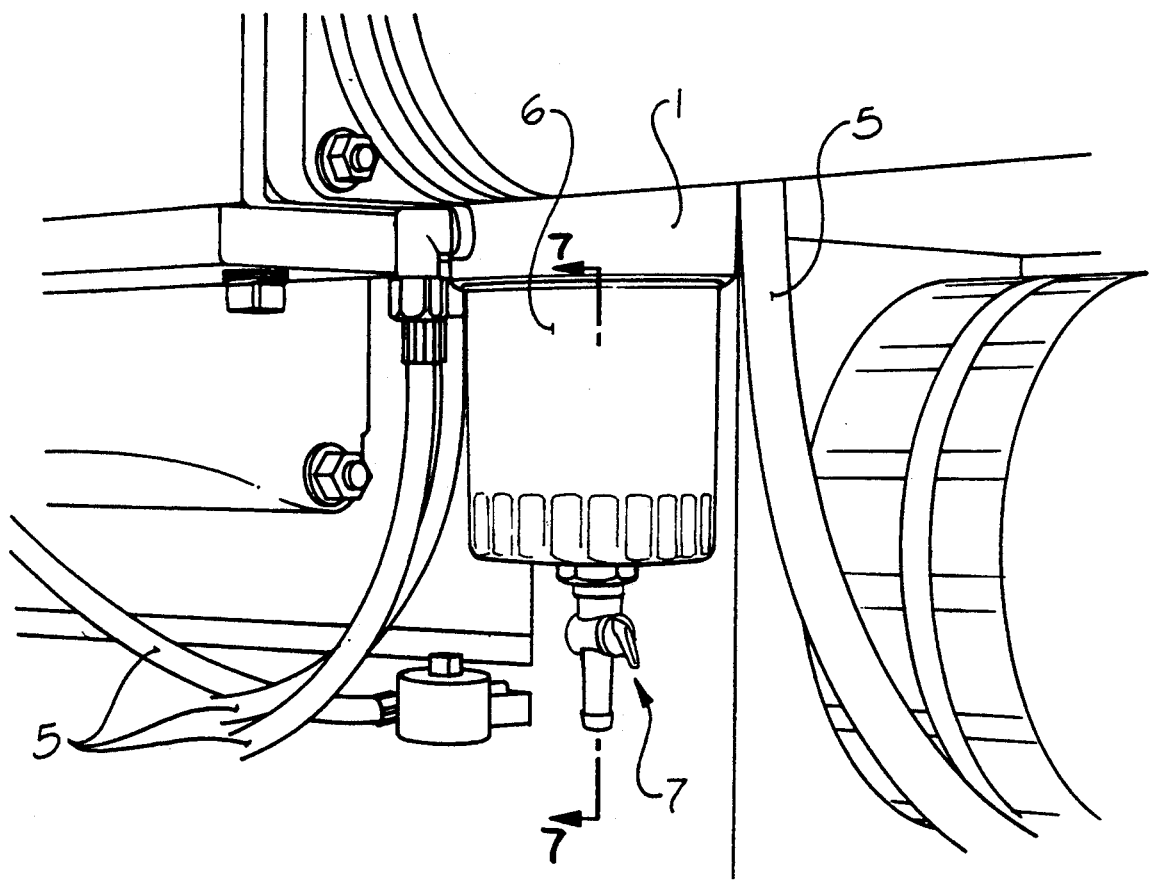
FIG. 6 is a pictorial view showing the oil filter cartridge of the present invention affixed to the engine, and further showing the valve affixed to the filter cartridge.

The present invention is designed particularly to relieve the problem of oil changes in marine engines, wherein the engine is in cramped quarters of an engine compartment (FIGS. 2 and 3), which is made even more cramped by hoses 5 and pipes being present in the engine compartment (FIGS. 4 and 5). If engine oil 3 escapes during the changing of the oil filter 2, the oil drops into the bilge (FIG. 3) and is then pumped into the water where pollution occurs. In an effort to keep oil from dropping into the bilge, the oil changer caught the oil escaping during removal of the oil filter cartridge 2 in a plastic bag 4 (FIGS. 4 and 5). Of course, this was inefficient and in many instances oil escaped and dripped from the bag and dirtied the hands as well as the boat. Moreover, the bag and contents presented a disposal problem. With as much as a quart of oil being contained in the filter cartridge, non-polluting disposal oil and filter cartridge in the plastic bag presented a problem.

Figure 12:
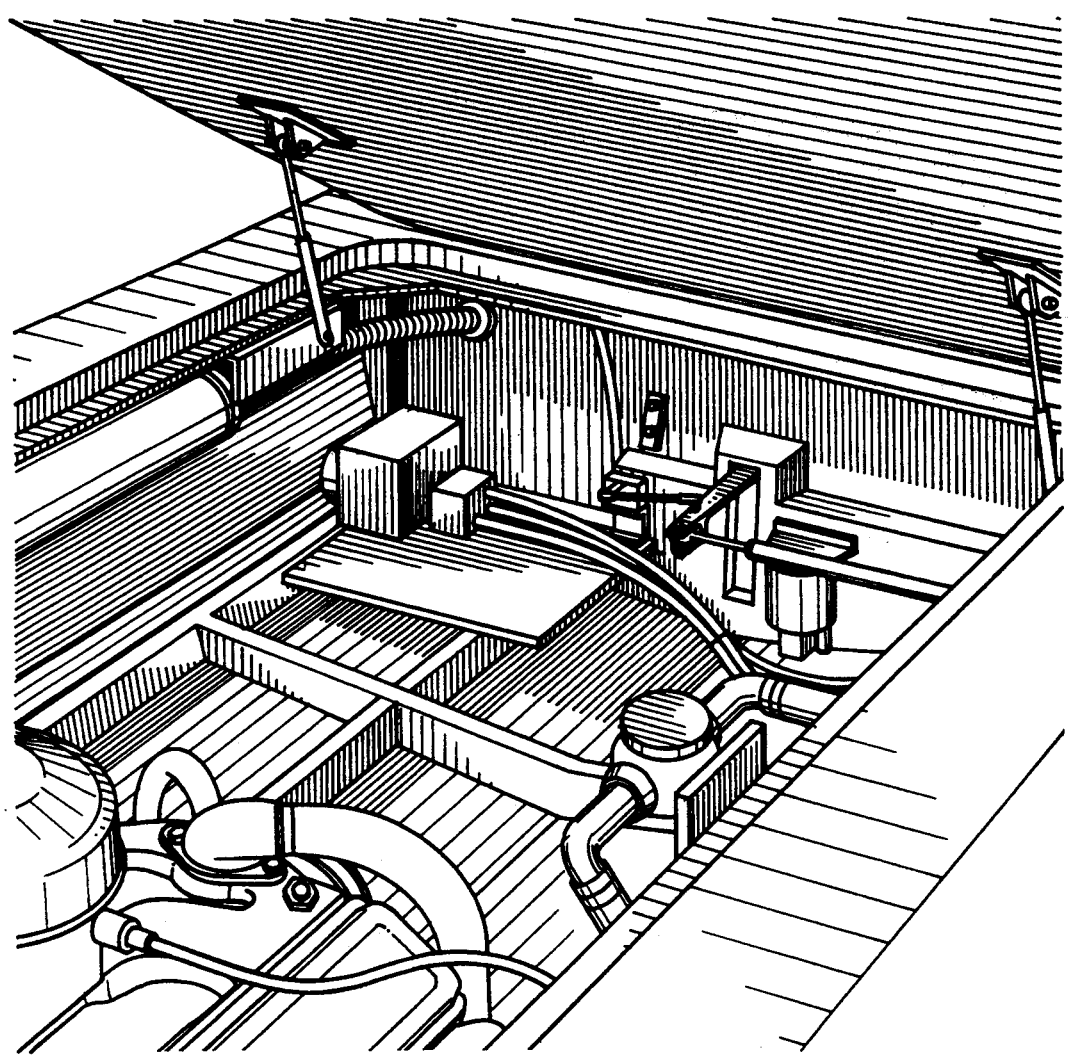
FIG. 12 is a pictorial view of a clean bilge area as a result of employing the valved filter cartridge of this invention.
Figure 14:
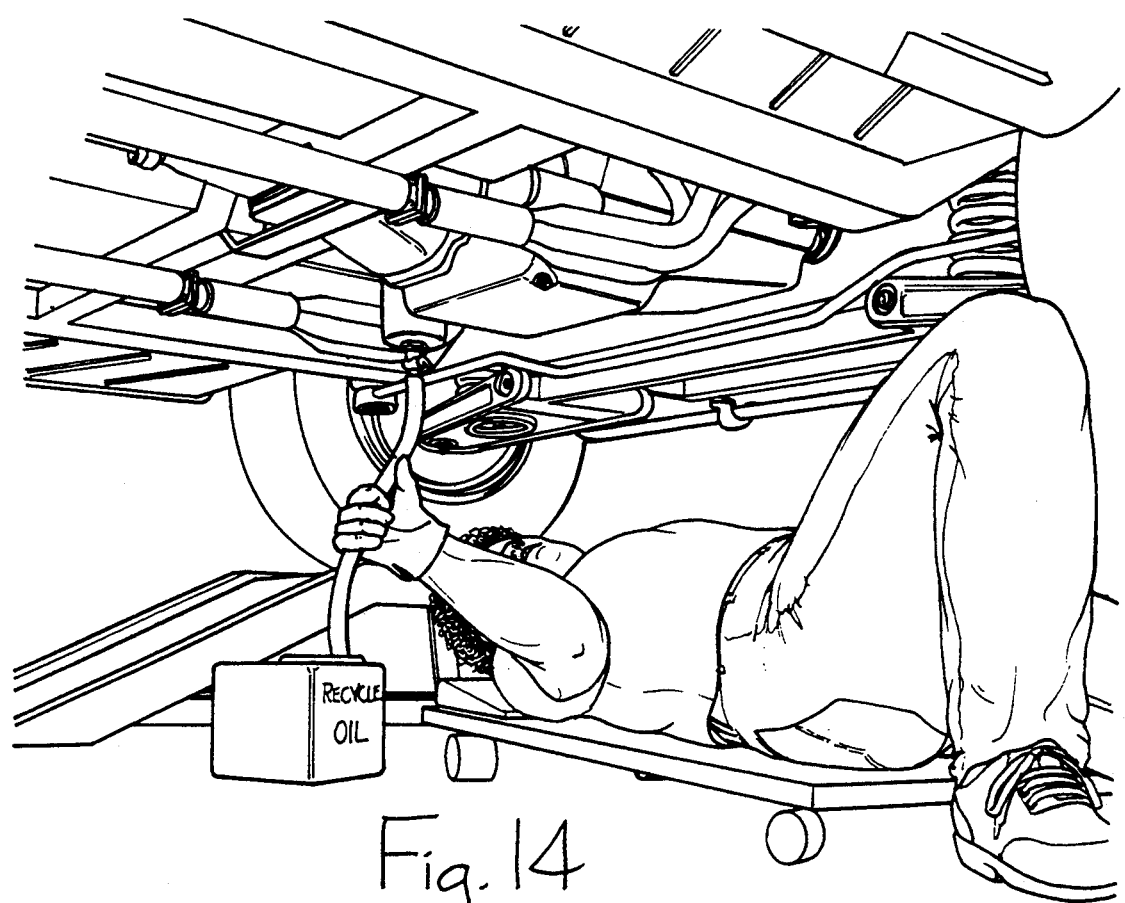
FIG. 14 is a further pictorial view, showing the homeowner beneath the car and fitting a hose on to the nipple of the replaceable oil filter.
Figure 15:
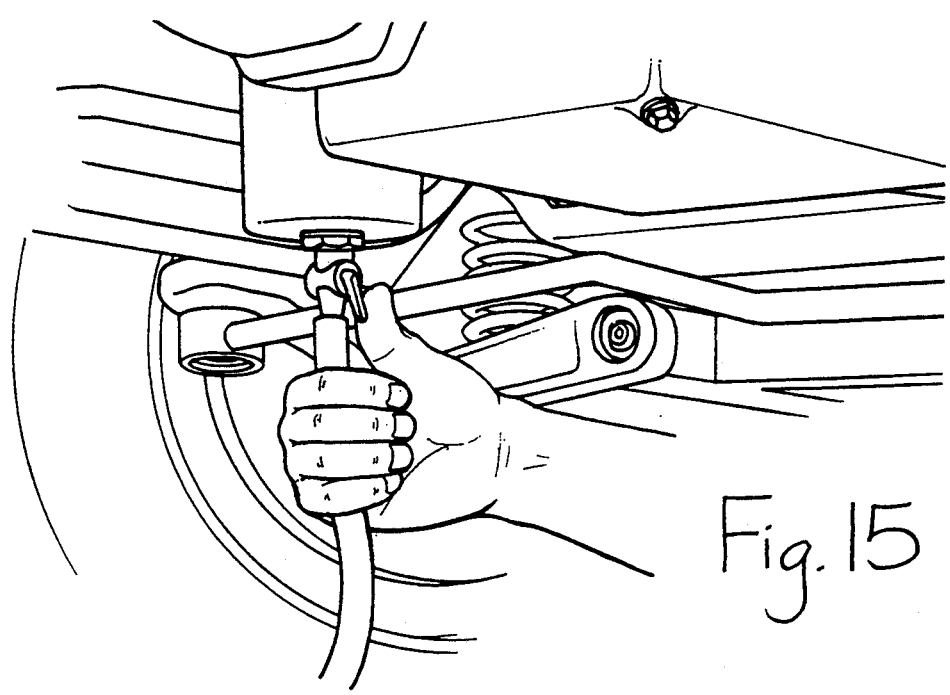
FIG. 15 is a still further pictorial view, showing the valve being turned to drain the residual oil out of the filter once the crankcase oil has been drained.

Instead of the use of plastic bags 4 (as used by the prior art) to capture residual oil spills 6 and then removing the oil filter cartridge 2, the invention herein involves an oil filter cartridge 6 having a valve 7 built into the cartridge 6 so that residual oil remaining in the filter cartridge 6 can be drained by opening the valve 7 and allowing the residual oil to run directly into a storage container 8 for reuse or non-polluting disposal. As a result of using the special valved oil filter cartridge and method of this invention the engine bilge area is spotless (FIG. 12).

Figure 7:
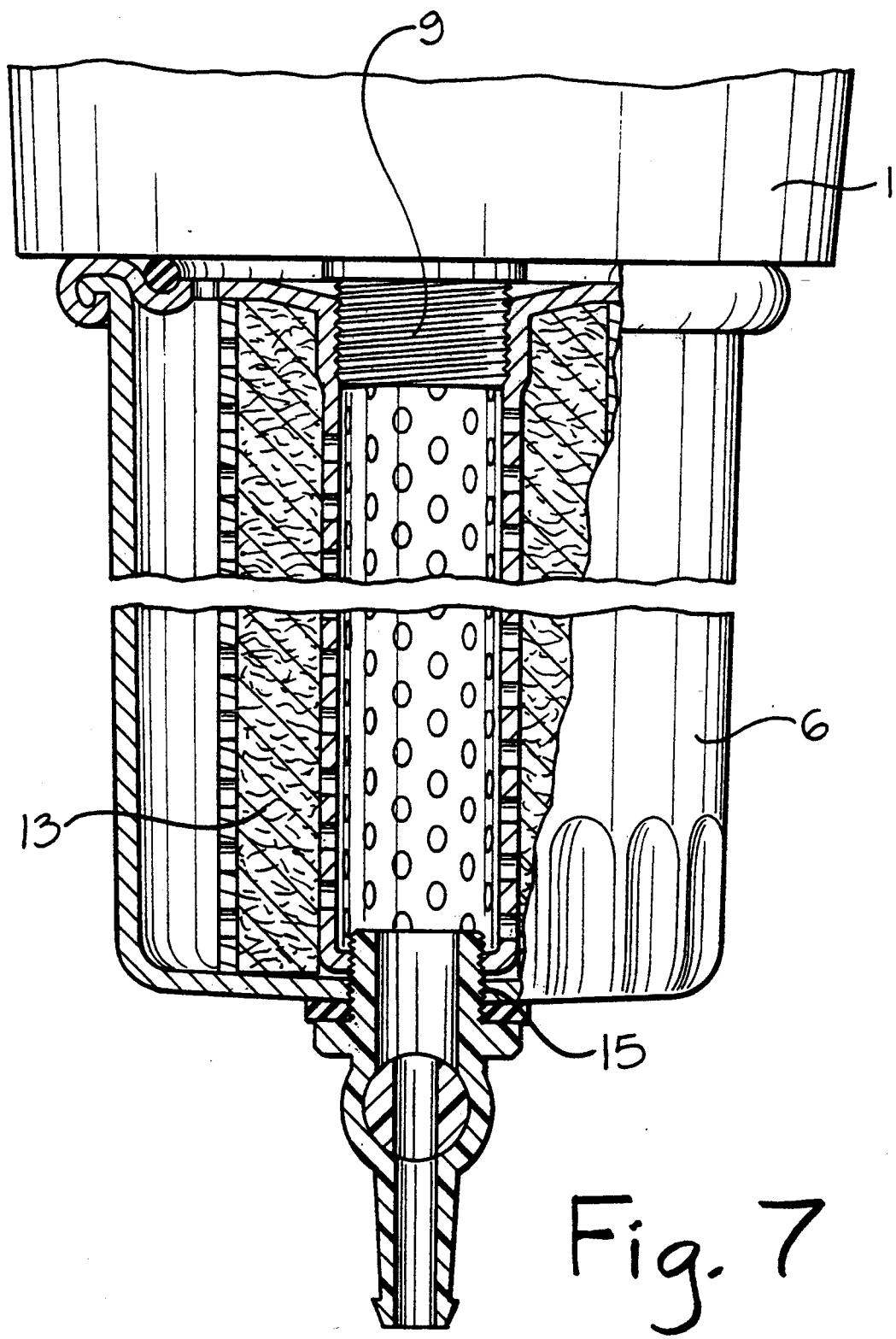
FIG. 7 is a cross-sectional view thereof, partly in elevation, taken across the lines 7—7 of FIG. 6 and drawn to an enlarged scale, the valve being shown in the open position, and the filter material 13 and thread 15 for attaching valve being shown.
Figure 8:
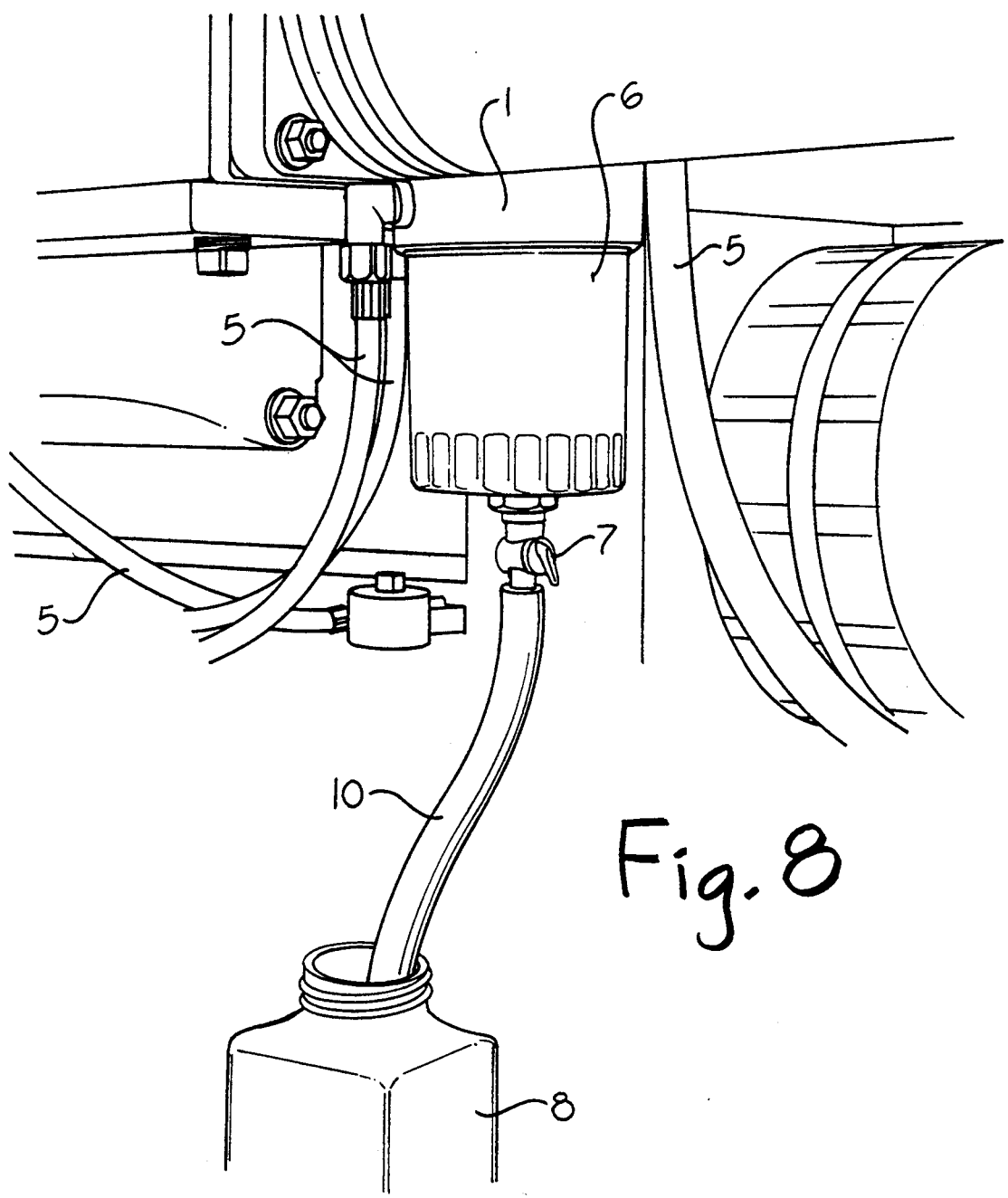
FIG. 8 shows the oil filter cartridge of the present invention with valve attached to a hose to drain residual oil (remaining in the filter itself) into a suitable container.
Figure 10:
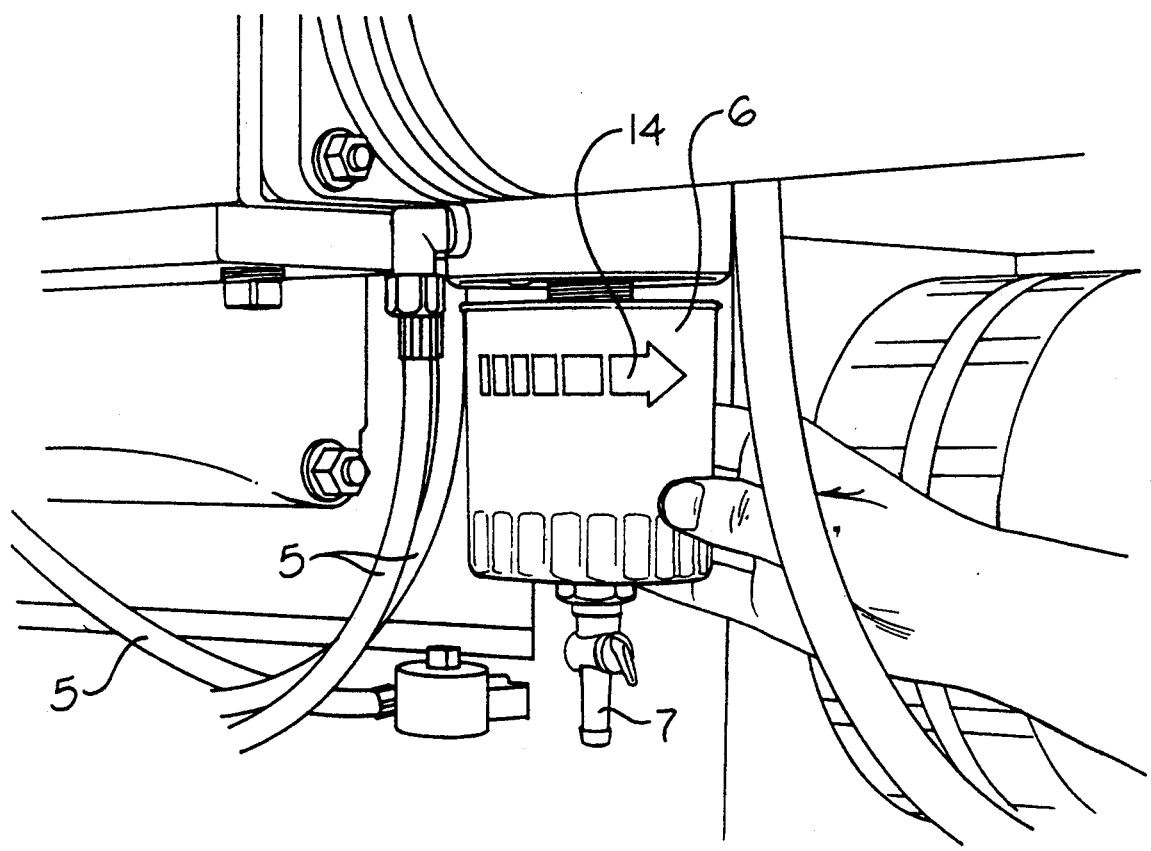
FIG. 10 shows a new oil filter cartridge being refitted to the engine. The arrow shows the direction that the cartridge is turned for replacement on the engine.
Figure 11:
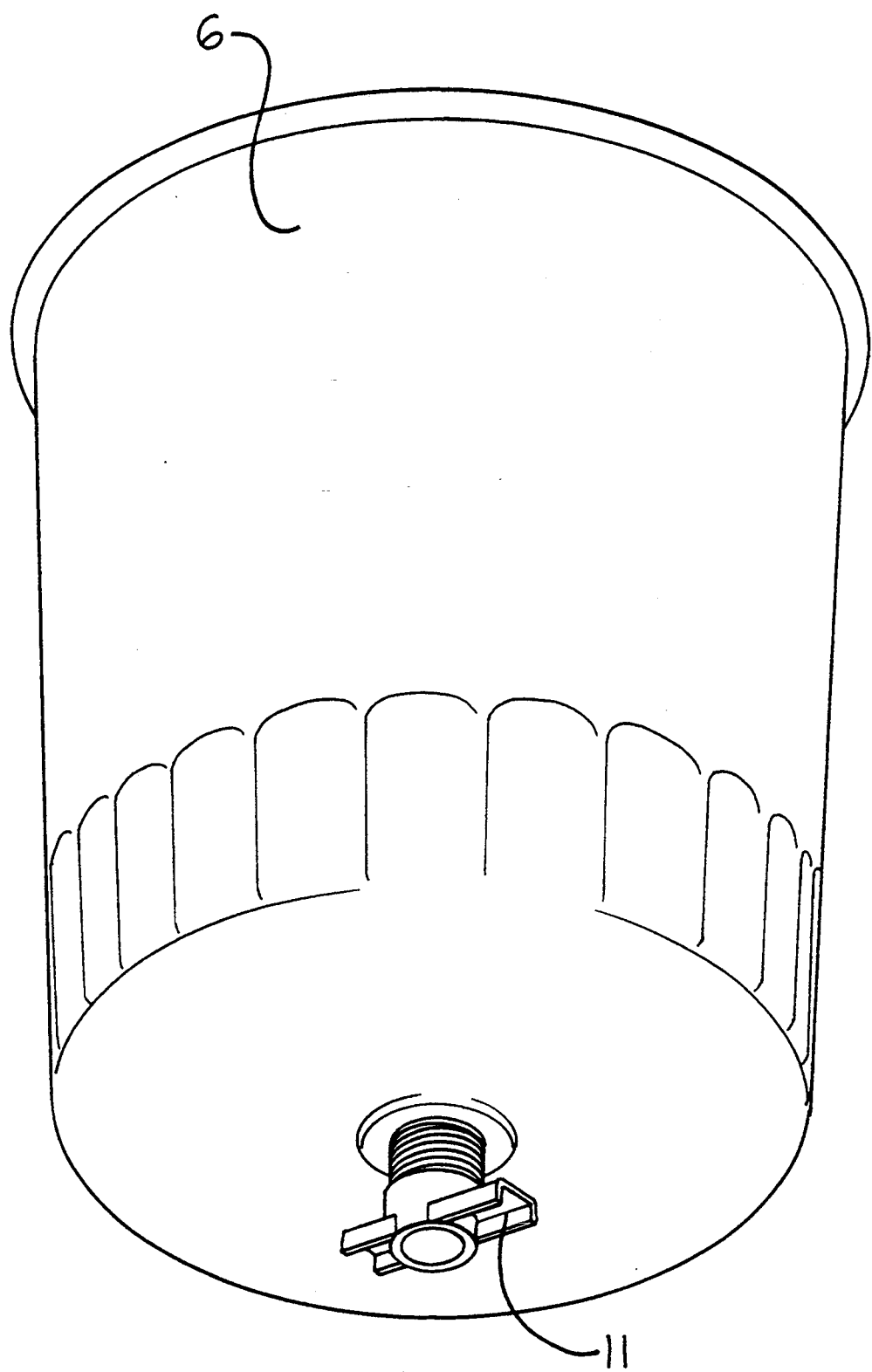
FIG. 11 is a modification, showing an oil filter cartridge having a petcock valve 11 rather than the valve shown in the previous drawings.

In a further embodiment, an oil filter cartridge 6 with a valve 7 is attached to an engine 1, through threaded means 9, the engine 1 is drained of crankcase oil and then the residual oil is drained by use of the valve 7 on the cartridge 6. As shown clearly in FIG. 7, a nipple 100 is carried by the bottom of the filter 6 and has the valve 7 disposed therein. This valve 7 may be turned about an axis which is transverse to the central longitudinal axis of the filter as shown in FIG. 8. A hose 10 may be placed on a lower portion of the nipple 100, as shown clearly in FIG. 8, to lead residual oil into a container 8 for disposal. Instead of a valve on the cartridge 6, the valve may be substituted by a closed orifice which could be readily opened to drain any residual oil in the cartridge. As an example of a substitute for the valve on the cartridge, a petcock 11 may be substituted. Bag 12 can be used to dispose of the used filter cartridge.

While the preferred embodiment of this invention designates a valve for release and recovery of oil; also contemplated is a drain plug for release and recovery of the waste oil. Those skilled in the art realize that other equivalent valve and release means are known in the art and these come within the purview of this invention.

The marine engine is a typical example of the engines with which the teaching of the present invention may find most particular utility, but it will be appreciated by those skilled in the art that the present invention is not necessarily confined thereto.

With reference to FIGS. 13–20, the present invention may also be used for automotive and other engine applications.

A typical homeowner 100 may put his car 101 up on ramps 102 (FIG. 13) and slide underneath the car using a "creeper" 103 (FIG. 14) to attach a hose 104 to the nipple 105 of a replaceable oil filter 106. The other end of the hose 104 may be connected to a suitable container 107 for oil collection and recycling purposes. The valve 108 may then be turned (FIG. 15) to drain out the residual oil in the filter 106.

Figure 17:
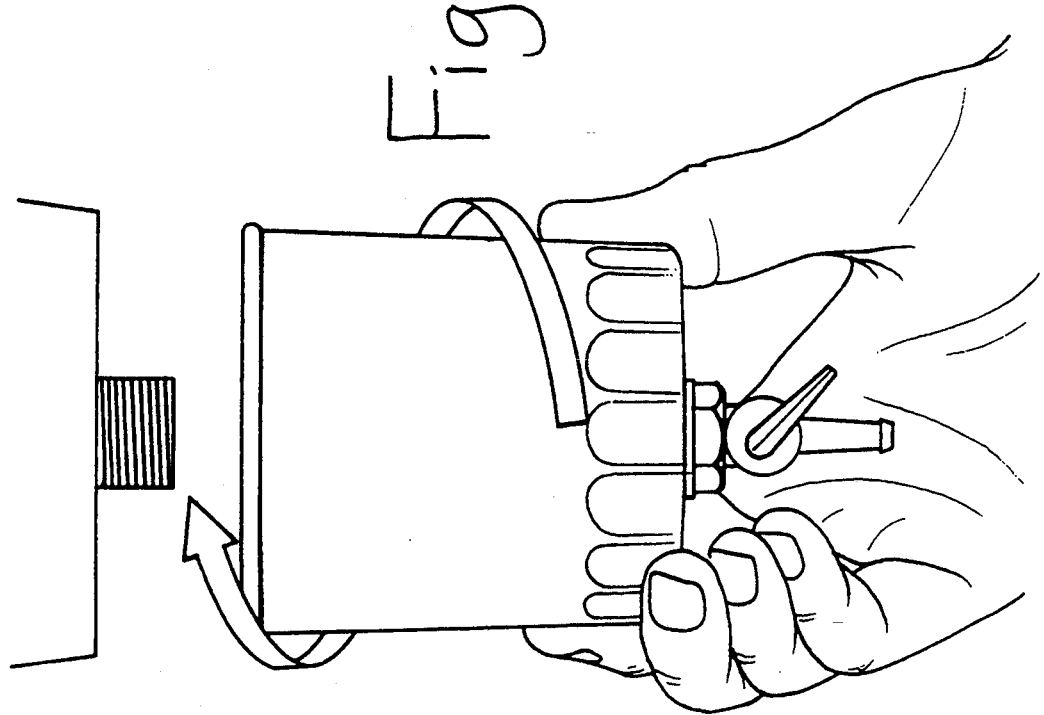
FIG. 17 is a further elevational view, showing a "new" oil filter being screwed on to the fitting (hand tight).
Figure 16:
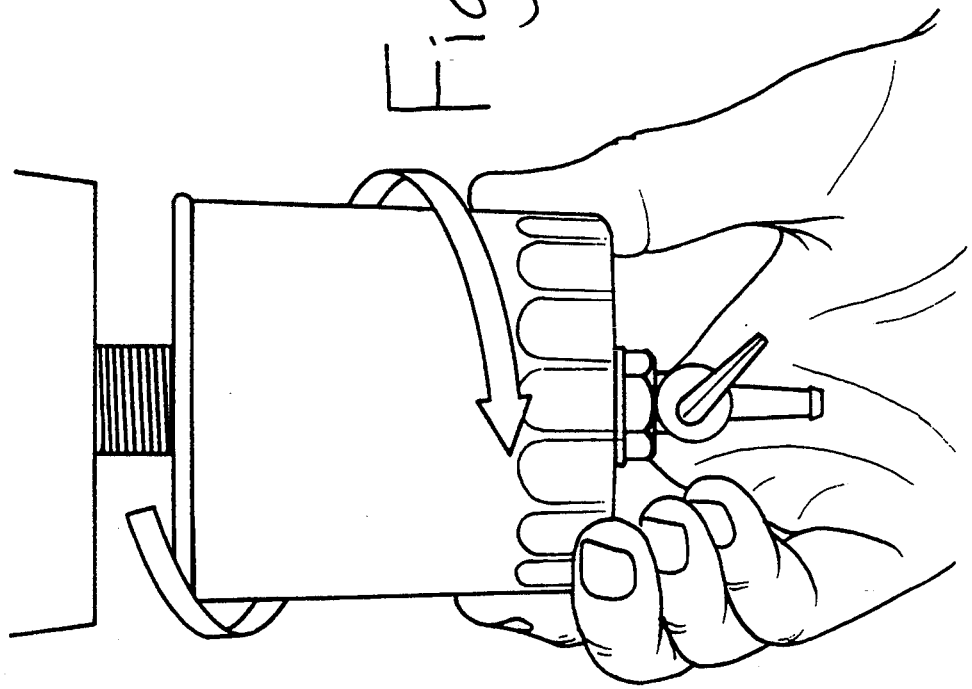
FIG. 16 is an elevational view, showing an "old" oil filter being unscrewed and removed (after the residual oil therein has been drained and collected).

Thereafter, the filter 106 may be unscrewed from the threaded fitting 109 (FIG. 16) and a new filter 106 screwed on to the fitting 109 and maintained hand tight (as shown in FIG. 17).

Figure 18:
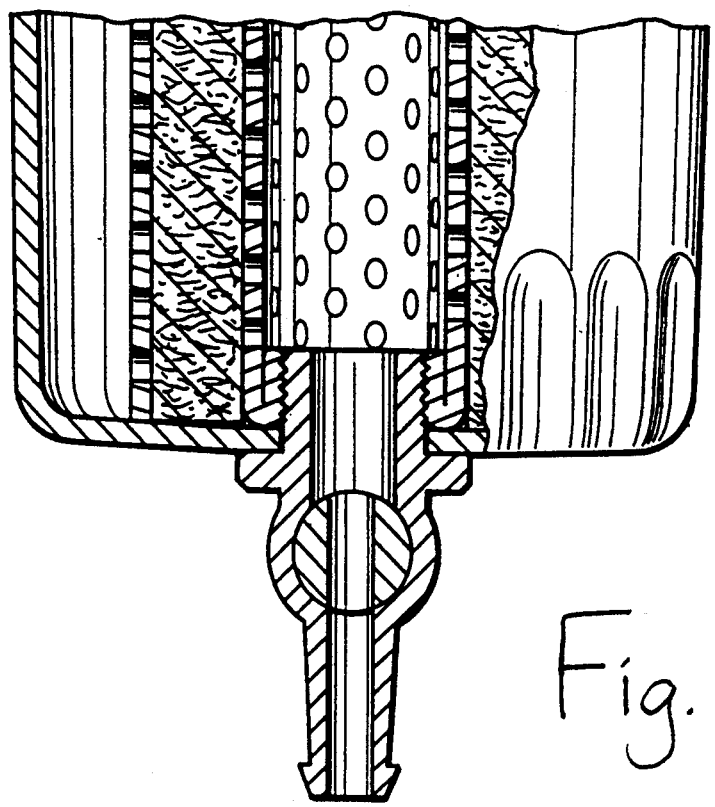
FIG. 18 is a longitudinal sectional view of the bottom of a modified filter.

With reference to FIG. 18, the filter 106 includes an inner sleeve 110, a concentric outer sleeve 111, and a filter material 112 therebetween. The inner sleeve 110 has a plurality of openings 113 formed therein, and the outer sleeve has a plurality of openings 114 formed therein for fluid communication purposes; and the filter 106 may also have a plurality of conventional fluted indents 115 for gripping purposes (all of which is conventional).

More importantly, the inner sleeve 110 has an inturned end portion 116 folded back upon itself (as shown in FIG. 18) and internally threaded to receive the externally-threaded portion 117 of the nipple 105. This nipple 105, which may be cast or machined out of brass or another suitable material, has an annular flange 118 seated against the bottom wall 119 of the filter 106 for fluid-sealing purposes.

Moreover, the nipple 105 has an enlarged intermediate portion 120 providing a spherical seat 121 for journaling the rotatable valve 108. The valve 108 has a central bore 122 communicating with the longitudinal bore 123 in the nipple 105 for draining the residual oil in the filter 106 (as shown in FIG. 18). The nipple 105 is aligned substantially with the longitudinal central axis 124 of the filter 106. The nipple 105 has an outer enlarged tapered end 125 for attaching and retaining the hose 104 on the nipple 105. The valve 108 is turned about an axis which is transverse (and more specifically, perpendicular) to the central longitudinal axis 124 of the filter 106.

Figure 19:
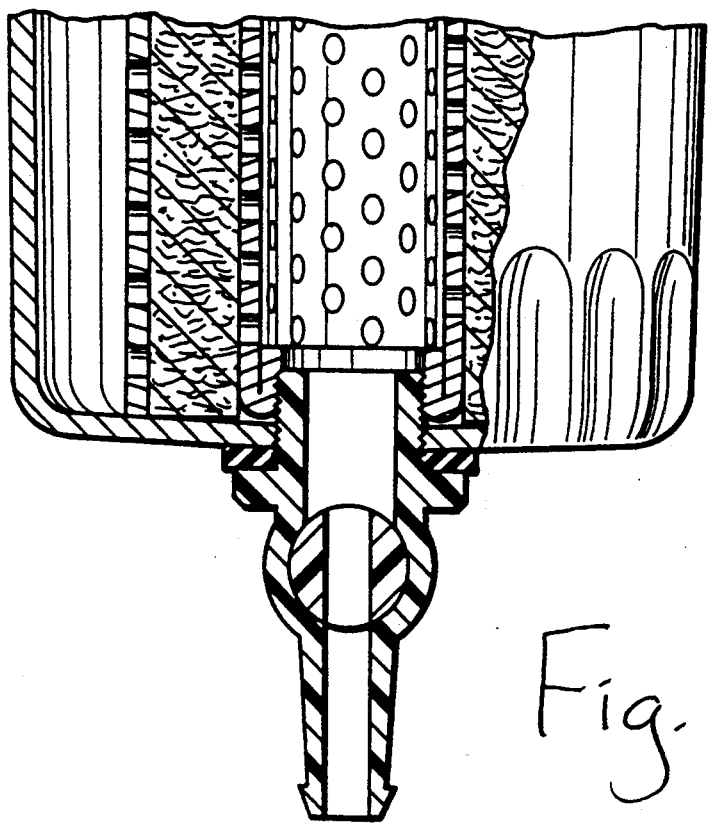
FIG. 19 is a further longitudinal sectional view, showing another modified filter.

The embodiment shown in FIG. 19 is substantially identical in structure and operation as the FIG. 18 embodiment of the present invention, but the nipple 126 shown in FIG. 19 is molded from a suitable plastic material, as is the valve 127. For sealing purposes, an annular elastomeric gasket 128 is provided.

Figure 20:
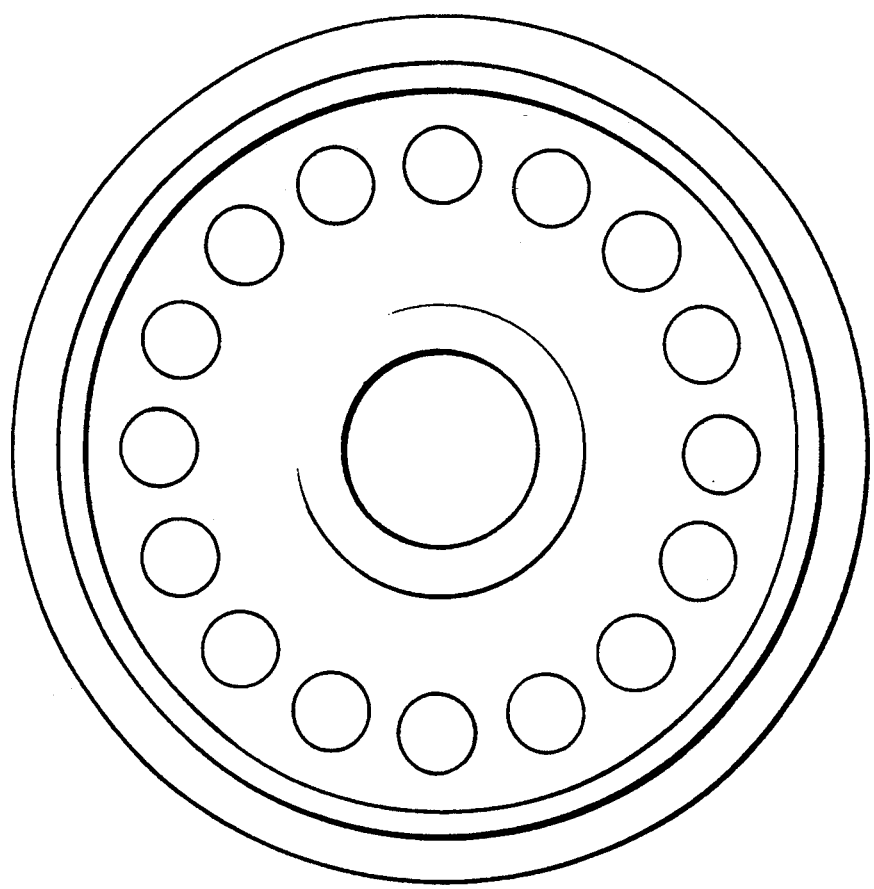
FIG. 20 is a top plan view of a typical filter.

The top portion of the filter 106 is basically conventional. As shown more clearly in FIGS. 7 and 20, the inner sleeve 110 is provided with internal threads 129 to match the external threads on the fitting 109 on the engine. Moreover, the inner sleeve 110 is formed integrally with a top wall 130 which forms an annular rolled edge 131 on the filter 106. An annular sealing gasket 132 is retained in the top wall 130 of the filter 106, and the top wall 130 is provided with a plurality of circumferentially-spaced openings 133 (FIG. 20).

The features and advantages of the present invention are as follows:

1. reduces costly pollution and protects the environment;
2. avoids messy clean ups and is easy and convenient to use;
3. readily appreciated by potential customers without the need for extensive promotion and customer education and training;
4. economical to manufacture and readily lends itself to high-volume automated production; and
5. a simple solution to a nagging problem of long standing.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A replaceable oil filter assembly for an engine comprising, in combination, an oil filter including a top portion having a gasket and further having a central threaded opening to receive a threaded stud on the engine, such that the oil filter may be hand screwed on to the threaded stud of the engine, the oil filter further including a bottom portion provided with a nipple extending therebelow, the nipple being substantially aligned with the central threaded opening in the top portion of the oil filter along a longitudinal central axis of the oil filter, and the nipple being provided with a valve, such that after the oil in the crankcase of the engine has been drained and before the oil filter has been unscrewed, the valve may be turned to allow the residual oil in the oil filter to be collected in a suitable container.

2. The combination of claim 1, wherein the engine is a marine engine in an engine compartment, the engine compartment having a bilge.

3. The combination of claim 1, wherein the engine is an automotive engine.

4. The combination of claim 1, wherein the valve is turned about an axis substantially perpendicular to the longitudinal central axis of the oil filter.

5. The combination of claim 1, wherein the nipple includes an enlarged intermediate portion provided with a spherical seat formed therein, and wherein the valve is rotatably journaled in the spherical seat in the enlarged intermediate portion of the nipple.

6. The combination of claim 1, wherein the nipple includes an outer enlarged tapered end, and wherein a hose has an end fitted on to the outer enlarged tapered end of the nipple, such that the other end of the hose may be received within a container for collecting the residual oil in the filter.

7. A replaceable oil filter assembly for an engine comprising, in combination, an oil filter including a top portion having a gasket and further having a central threaded opening to receive a threaded stud on the engine, such that the oil filter may be hand screwed on to the threaded stud of the engine, the oil filter further including a bottom portion provided with a nipple extending therebelow, the nipple being substantially aligned with the central threaded opening in the top portion of the oil filter along a longitudinal central axis of the oil filter, and the nipple being provided with a valve, such that after the oil in the crankcase of the engine has been drained and before the oil filter has been unscrewed, the valve may be turned to allow the residual oil in the oil filter to be collected in a suitable container, wherein the oil filter includes an inner sleeve, an outer concentric sleeve and a filter therebetween, the inner and outer sleeves each having a respective plurality of openings formed therein; wherein the inner sleeve includes an internally-threaded inturned end portion; and wherein the nipple includes an inner externally-threaded end received within the internally-threaded inturned end portion of the inner sleeve.

8. The combination of claim 7, wherein the oil filter includes a bottom wall, and wherein the nipple includes an annular flange seated against the bottom wall of the oil filter.

9. The combination of claim 8, further including an annular gasket between the annular flange on the nipple and the bottom wall of the oil filter.

10. In a disposable oil filter for an engine having a crankcase, the improvement which comprises a nipple means carried by the filter and in communication therewith, means on the nipple means for connecting one end of a hose thereto, such that the other end of the hose may be placed in a suitable container, and valve means associated with the nipple means for draining out the residual oil from the filter after the oil has been drained out of the engine crankcase and before the filter has been removed from the engine.

11. The method of changing the disposable oil filter on an engine, wherein the engine has a crankcase, which comprises the steps of draining the oil out of the crankcase, providing a container, opening a valve on the filter to allow the residual oil in the filter to drain into the container, unscrewing the filter after the residual oil has been drained therefrom, providing a new oil filter, and screwing the new oil filter on to the engine.

12. The method of claim 11, further including the steps of providing a nipple on the bottom of the filter, the nipple being aligned with the central longitudinal axis of the filter and the valve being disposed within the nipple and rotatable about an axis transverse to the central longitudinal axis of the filter, providing a hose, and connecting the hose between the nipple and the container.

* * * * *